United States Patent
Takada

(10) Patent No.: US 9,102,112 B2
(45) Date of Patent: Aug. 11, 2015

(54) TIRE VULCANIZATION MOLD AND MANUFACTURING METHOD THEREFOR

(71) Applicant: Noboru Takada, Hiratsuka (JP)

(72) Inventor: Noboru Takada, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/009,084

(22) PCT Filed: Nov. 5, 2012

(86) PCT No.: PCT/JP2012/078600
§ 371 (c)(1),
(2) Date: Sep. 30, 2013

(87) PCT Pub. No.: WO2013/114693
PCT Pub. Date: Aug. 8, 2013

(65) Prior Publication Data
US 2014/0370137 A1 Dec. 18, 2014

(30) Foreign Application Priority Data

Feb. 3, 2012 (JP) .................................. 2012-021680

(51) Int. Cl.
*B29C 33/10* (2006.01)
*B29D 30/06* (2006.01)

(52) U.S. Cl.
CPC ........ *B29D 30/0606* (2013.01); *B29D 30/0629* (2013.01); *B29D 2030/0613* (2013.01); *B29D 2030/0617* (2013.01); *B29K 2905/02* (2013.01); *Y10T 29/49826* (2015.01)

(58) Field of Classification Search
CPC .................. B29D 30/0606; B29D 2030/0617; B29C 33/10
See application file for complete search history.

(56) References Cited

U.S. PATENT DOCUMENTS

| | | | | |
|---|---|---|---|---|
| 3,553,790 A | * | 1/1971 | Brobeck et al. | 425/812 |
| 8,740,596 B2 | * | 6/2014 | Miyazaki et al. | 425/812 |
| 8,834,143 B2 | * | 9/2014 | Miyazaki | 425/812 |

FOREIGN PATENT DOCUMENTS

| | | |
|---|---|---|
| JP | 2005-193577 | 7/2005 |
| JP | 2009-269636 | 11/2009 |
| JP | 2012-136017 | 7/2012 |
| JP | 2012-171303 | 9/2012 |

OTHER PUBLICATIONS

International Search Report dated Jan. 29, 2013, 5 pages, Japanese Patent Office, Japan.

* cited by examiner

*Primary Examiner* — James Mackey
(74) *Attorney, Agent, or Firm* — Thorpe North & Western

(57) ABSTRACT

A manufacturing method for manufacturing a tire vulcanization mold may include: providing a projection that projects in the thickness direction midway in the vertical direction of the blade; providing a communicating portion that extends from below the projection to above the projection and that penetrates the blade in the thickness direction; forming the exhaust groove on the tire molding surface so the initial thickness of the exhaust groove is thinner than the thickness of the projection; inserting and positioning the bottom end of the blade in the exhaust groove; forming a small gap between an upper side portion of the projection of the embedded blade and the exhaust groove by embedding the positioned blade by press fitting in the depth direction into the exhaust groove while expanding the exhaust groove in the thickness direction by the projection; and linking the small gap and the exhaust hole through the communicating portion.

8 Claims, 17 Drawing Sheets

_US 9,102,112 B2_

TIRE VULCANIZATION MOLD AND MANUFACTURING METHOD THEREFOR

TECHNICAL FIELD

The present technology relates to a tire vulcanization mold and a manufacturing method therefor, and more particularly relates to a tire vulcanization mold that can ensure stable evacuation of gas while strongly embedding a blade in an exhaust groove formed in a tire molding surface, and a manufacturing method therefor.

BACKGROUND

When vulcanizing a tire, unnecessary air becomes trapped in the tire vulcanization mold, and gas is produced by vulcanization. This air or gas produces vulcanization defects such as insufficient filling with rubber of the tire to be vulcanized. Therefore, tire vulcanization molds include an exhaust means for evacuating the air or gas produced when vulcanizing to the outside.

A structure in which a narrow hole that forms an exhaust groove is provided in the tire molding surface, and by embedding a blade so that it fits in this narrow hole, a small gap is formed between the blade and the long side of the narrow hole has been proposed as the exhaust means (see Japanese Unexamined Patent Application Publication No. 2009-269363). Air and/or gas are evacuated out of the mold through this small gap.

However, if the blade is weakly embedded in the exhaust groove, during vulcanization of the tire, the blade shifts and the size of the small gap can vary. In this case, stable evacuation of the gas cannot be ensured during vulcanization and tire vulcanization defects are likely produced. Also, there is concern that the blade could fall out of the exhaust groove as a result of continuous use of the mold.

SUMMARY

The present technology provides a tire vulcanization mold that ensures stable evacuation of gas while strongly embedding a blade in an exhaust groove formed in a tire molding surface, and a manufacturing method therefor.

The tire vulcanization mold comprises: an exhaust groove opening to a tire molding surface; a blade embedded in the exhaust groove and that forms a small gap with the exhaust groove; and an exhaust hole that links the small gap with the outside of the mold, wherein the blade includes a projection that projects in a thickness direction midway in a vertical direction, and a communicating portion that extends from below the projection to above the projection and that penetrates the blade in the thickness direction, the small gap is formed between a portion of the exhaust groove expanded in the thickness direction by the projection and an upper side portion of the projection of the blade by embedding the blade by press fitting in a depth direction into the exhaust groove, and the small gap is linked with the exhaust hole through the communicating portion.

The manufacturing method for a tire vulcanization mold according to the present technology in which a small gap is formed between an exhaust groove and a blade by embedding the blade in the exhaust groove opening to a tire molding surface of the tire vulcanization mold, and the small gap is linked to an exhaust hole opening to the outside of the mold, the method comprises: providing a projection that projects in a thickness direction midway in a vertical direction of the blade; providing a communicating portion that extends from below the projection to above the projection and that penetrates the blade in the thickness direction; forming the exhaust groove so that the thickness of the exhaust groove is thinner than the thickness of the projection; inserting and positioning the bottom end of the blade in the exhaust groove; forming the small gap between an upper side portion of the projection of the embedded blade and the exhaust groove by embedding the positioned blade by press fitting in the depth direction into the exhaust groove while expanding the exhaust groove in the thickness direction by the projection; and linking the small gap and the exhaust hole through the communicating portion.

According to the present technology, the blade includes the projection that projects in the thickness direction midway in the vertical direction, and the communicating portion that extends from below the projection to above the projection and that penetrates the blade in the thickness direction, the blade is embedded by press fitting in the depth direction into the exhaust groove and expanding the exhaust groove in the thickness direction, so the blade is strongly fixed in the exhaust groove. Also, the small gap with stable dimensions is formed between the portion of the exhaust groove that has been expanded in the thickness direction by the projection and the upper side portion of the projection of the blade, so the exhaust hole linked to the outside of the mold and the small gap are linked through the communicating portion, which ensures stable evacuation of gas during vulcanization of the tire. Associated with this is the benefit that vulcanization defects of the tire are prevented.

Here, an auxiliary groove to be connected to the communicating portion can be provided in the upper side portion of the projection of the blade. In this case, evacuation of gas is promoted through the auxiliary groove, so it is possible to improve the evacuation efficiency.

The communicating portion can be, for example, a through hole that penetrates the blade in the thickness direction. In this case, the strength of the bottom end of the blade is increased, so it is easy to reduce deformation of the blade when press fitting the blade into the exhaust groove. In other words, the blade can be easily made thinner.

DETAILED DESCRIPTION

A tire vulcanization mold and a manufacturing method therefor according to the present technology will be described below, based on the embodiments illustrated on the drawings. The arrow C, the arrow R, and the arrow W illustrated in FIGS. 1 to 3 indicate the circumferential direction, the radial direction, and the width direction, respectively, of a green tire vulcanized by insertion into the vulcanizing mold.

Figure 1:
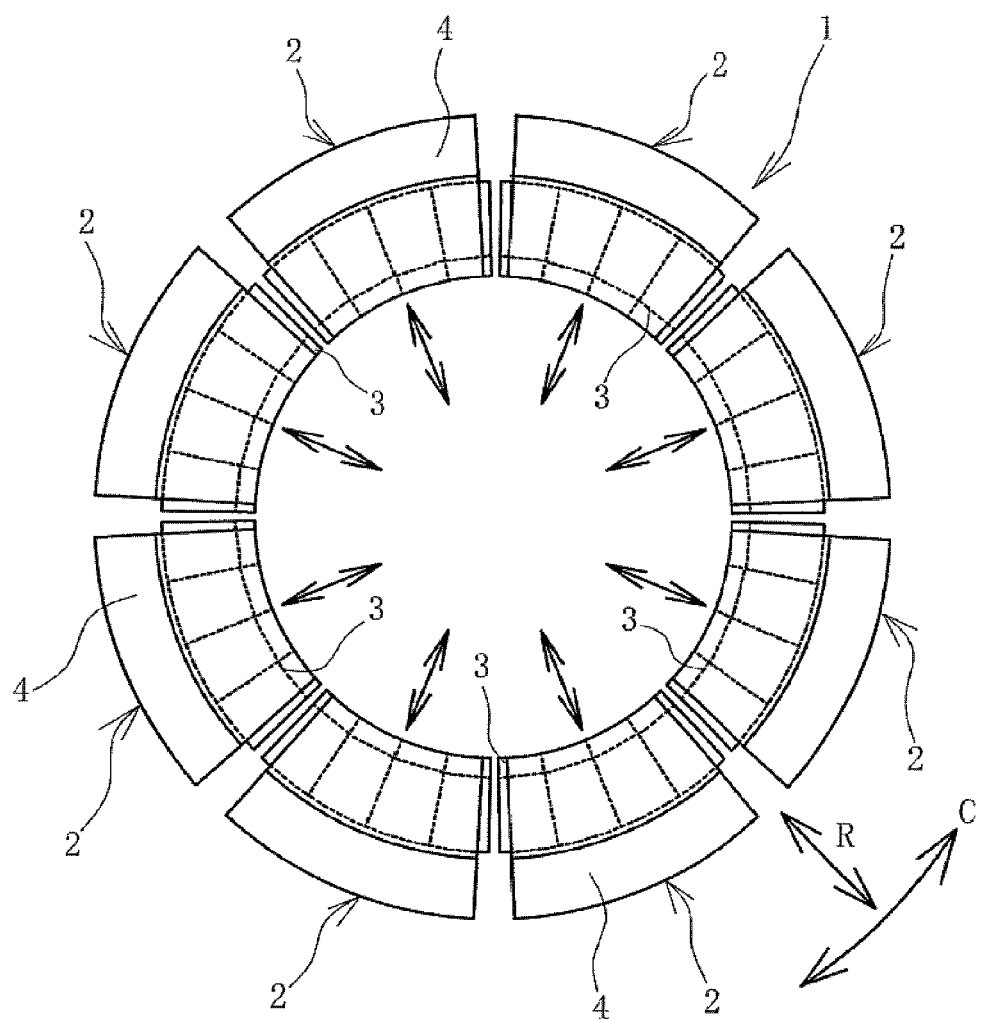
FIG. 1 is a plan view illustrating a tire vulcanization mold according to the present technology.
Figure 2:
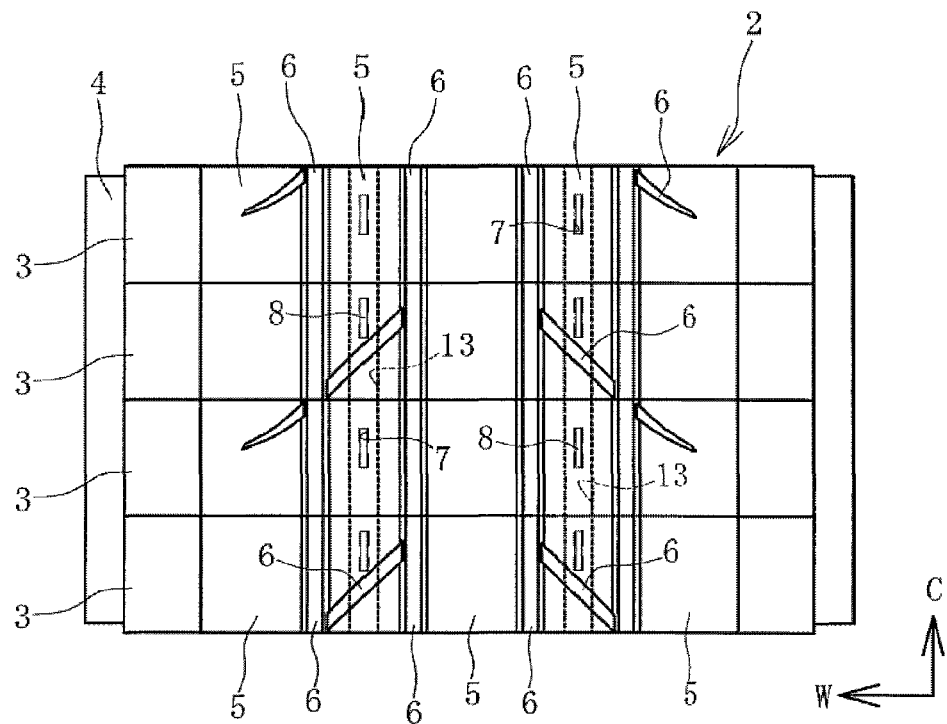
FIG. 2 is a plan view illustrating sectors in FIG. 1.
Figure 3:
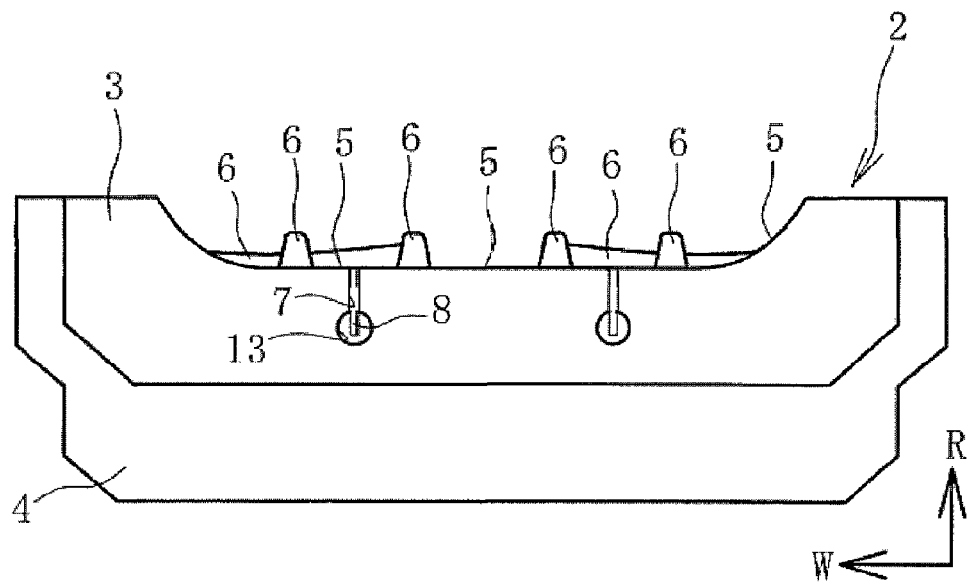
FIG. 3 is a front view of the sectors in FIG. 2.
Figure 4:
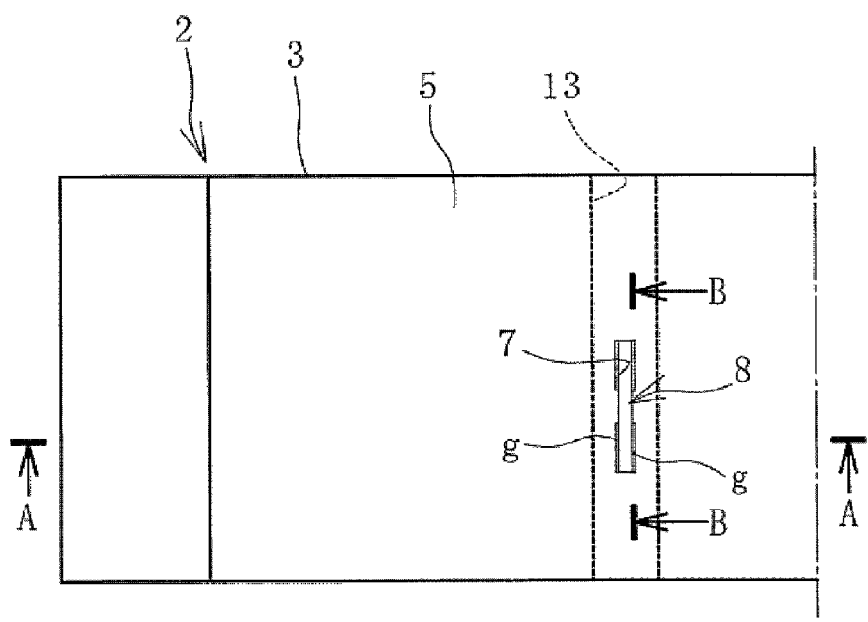
FIG. 4 is an enlarged plan view of a portion of a sector in FIG. 2.
Figure 5:
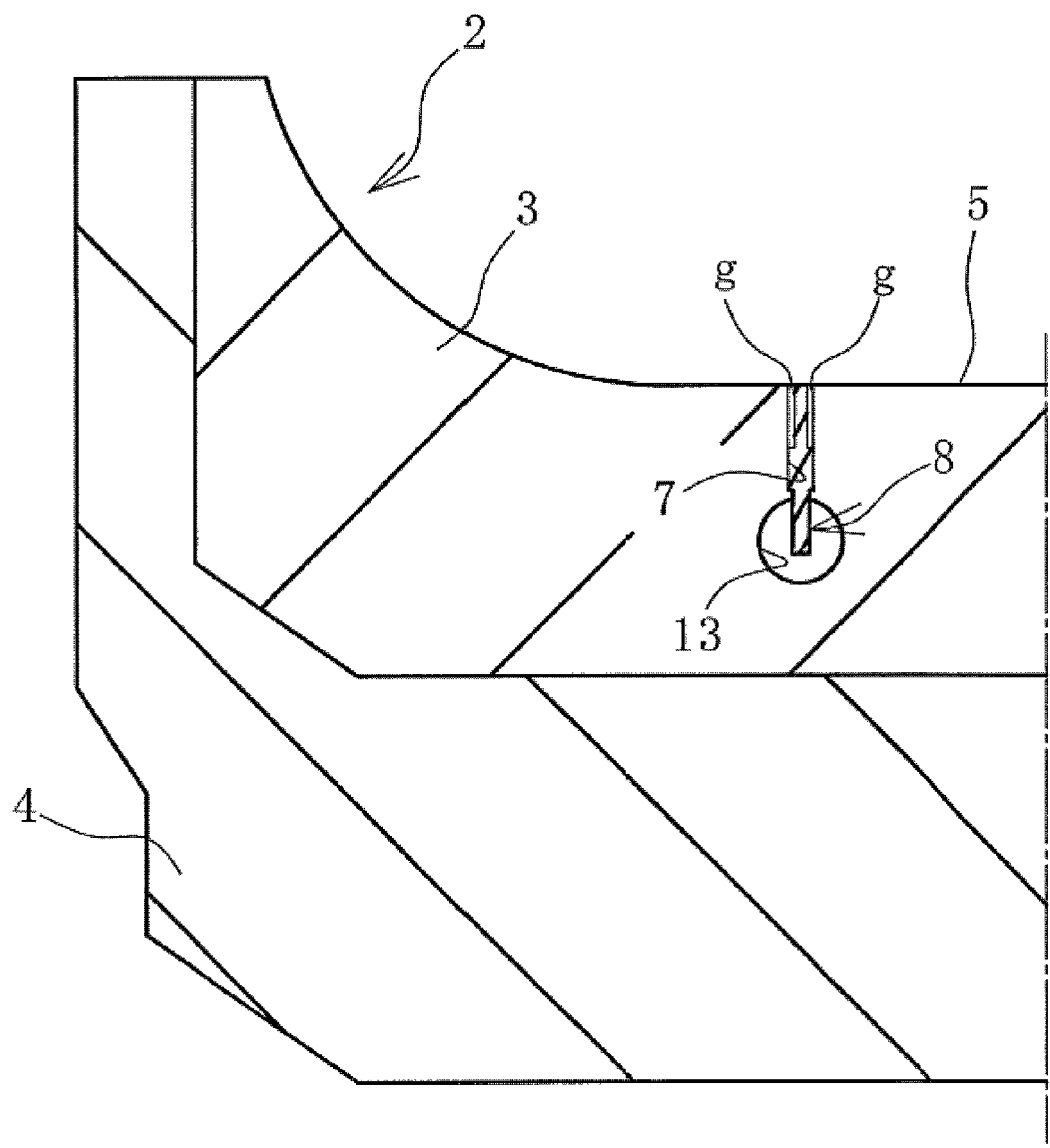
FIG. 5 is a cross-sectional view taken along A-A of FIG. 4.

As illustrated in FIG. 1, a tire vulcanization mold 1 according to the present technology (hereinafter, referred to as mold 1) is a sectional type constituted by a plurality of circular arc shaped sectors 2 assembled in a ring shape. As illustrated in FIGS. 2 and 3, each sector 2 includes a single back block 4 and a plurality of pieces 3, with the adjacent pieces 3 in close contact with each other fitted to the back block 4.

Each of the sectors 2 forming the ring shape move in and out relative to the center of the ring. The inner circumferential side surface of each piece 3 forms a tire molding surface 5. Groove forming projections 6 are provided as appropriate on the tire molding surface 5 for forming the grooves of the tire.

The piece 3 is formed by hardening a molten metal such as aluminum, aluminum alloy, or the like. The groove forming projections 6 are integral with the piece 3.

In this embodiment, a single sector 2 includes four pieces 3 that are rectangular in plan view. It is sufficient that the number of the pieces 3 in a single sector 2 be in plural, and their arrangement is also not limited to that of this embodiment.

As illustrated in FIGS. 4 to 8, exhaust grooves 7 are formed and opened in the tire molding surface 5. The exhaust grooves 7 are connected to exhaust holes 13 that extend from an end surface on a first side to an end surface on a second surface in the circumferential direction of the piece 3.

Figure 6:
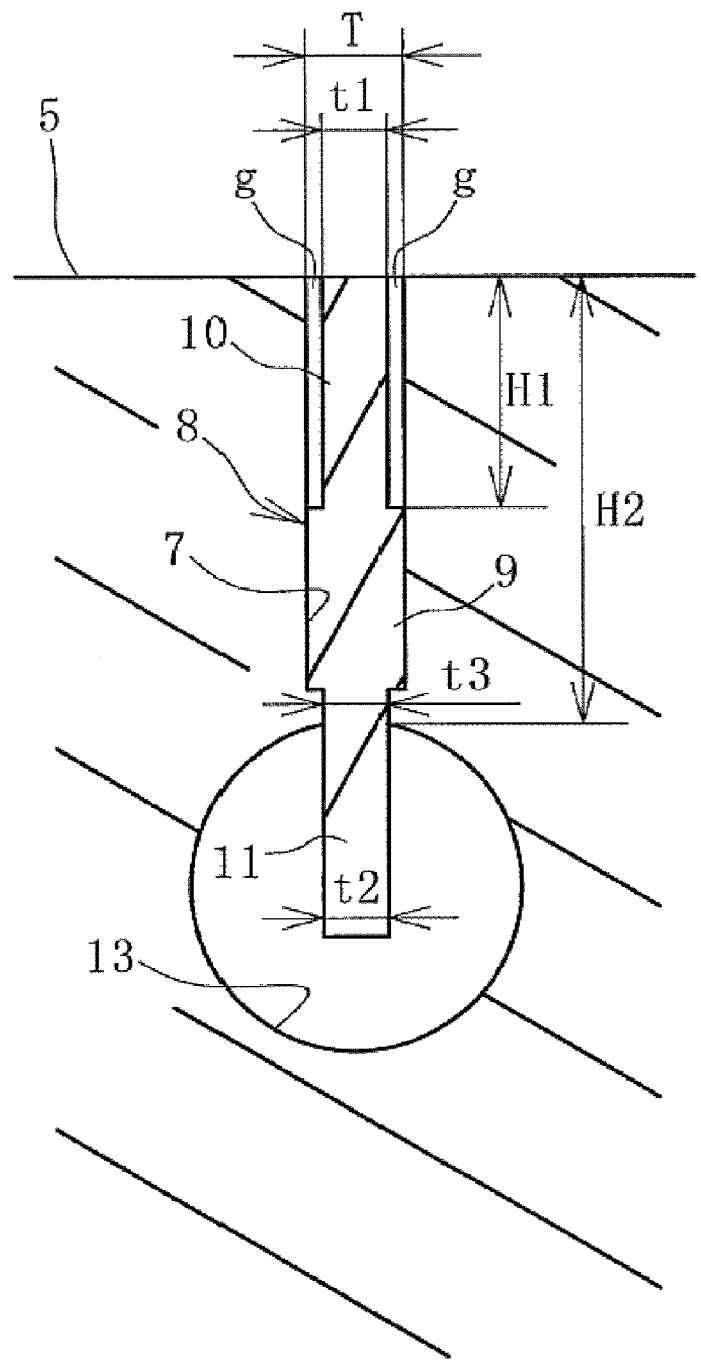
FIG. 6 is an enlarged view of a portion of FIG. 5.
Figure 7:
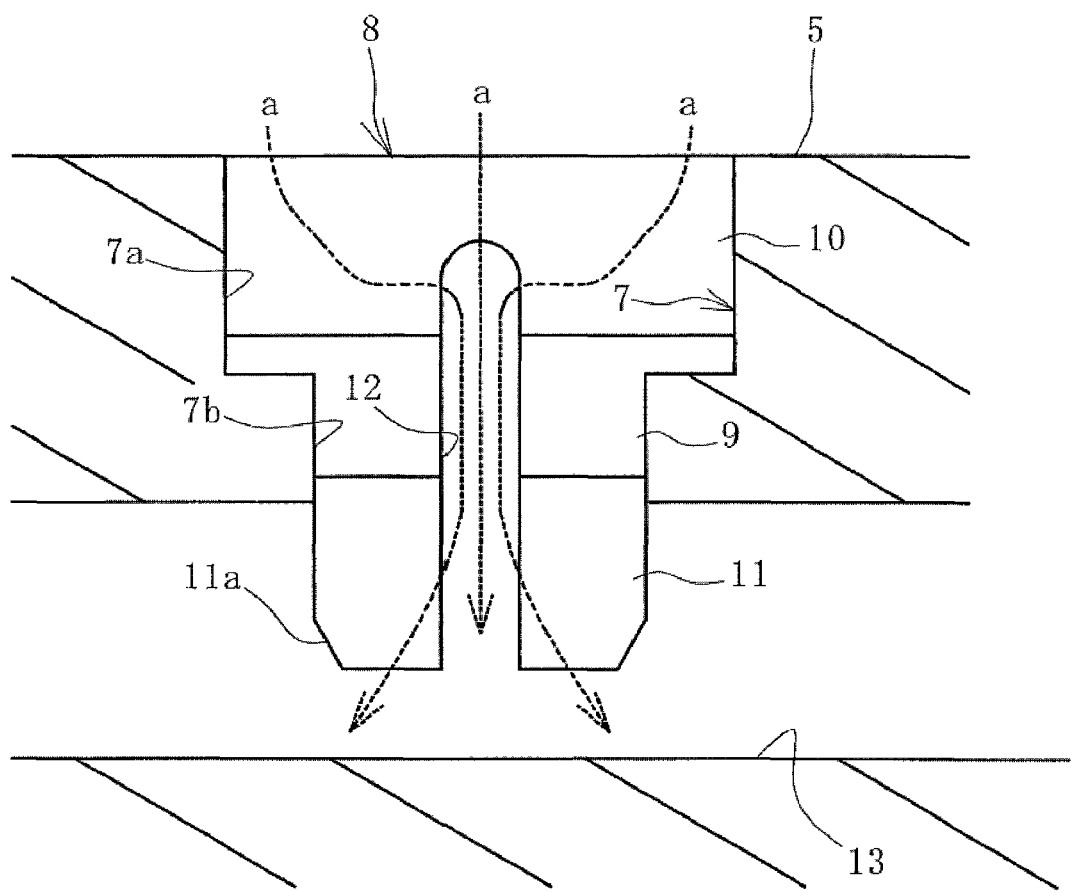
FIG. 7 is a cross-sectional view taken along B-B of FIG. 4.
Figure 8:
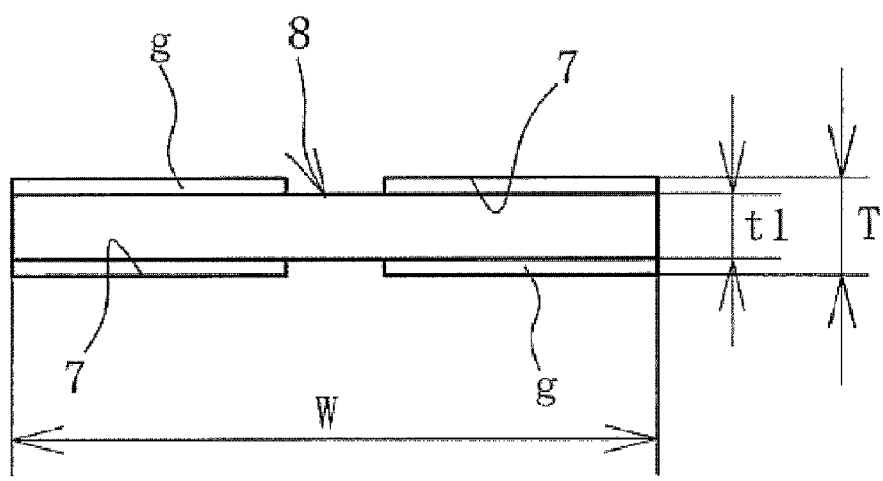
FIG. 8 is a plan view illustrating a blade and an exhaust groove of FIG. 4.

In this embodiment, as illustrated in FIG. 6, the exhaust groove 7 in which a blade 8 is embedded has a predetermined constant thickness T when viewed in the thickness direction, with only a bottom end portion having a constant thickness t3 that is thinner than the thickness T. As illustrated in FIG. 7, when viewed the exhaust groove 7 in the width direction, the exhaust groove 7 has a stepped shape in which a lower side portion 7b is narrower than an upper side portion 7a. As illustrated in FIG. 8, when viewed the exhaust groove 7 in the plan direction, the exhaust groove 7 has a constant thickness T at both end portions in the width direction, and the center portion is thinner than the thickness T. The width W of the exhaust groove 7 is, for example, about from 5.0 mm to 20.0 mm.

The blade 8 made from stainless steel or the like is embedded by press fitting into the exhaust groove 7. The top end surface of the blade 8 is substantially at the same level as the tire molding surface 5, and the bottom end of the blade 8 projects into the exhaust hole 13. The blade 8 is formed from a material harder than the piece 3.

Figure 9:
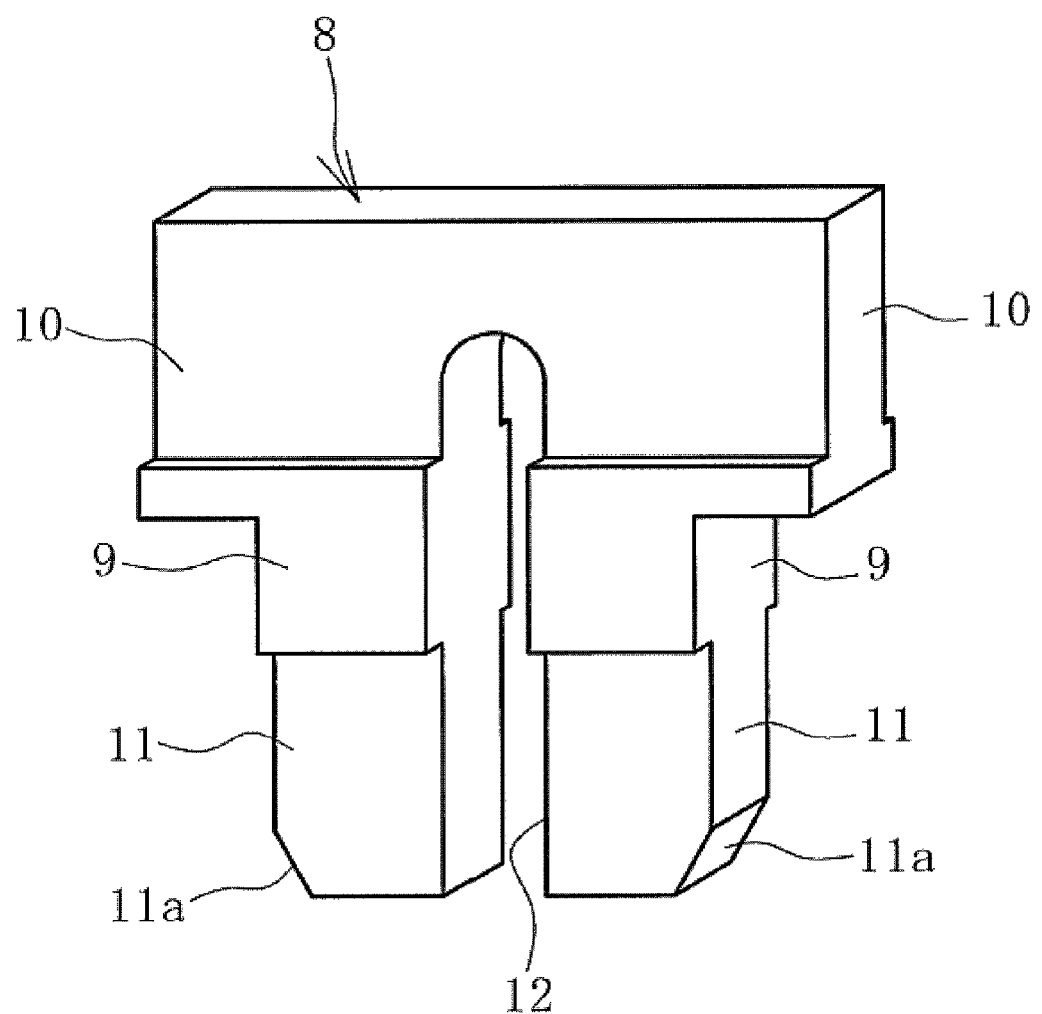
FIG. 9 is a perspective view illustrating the blade of FIG. 4.

As illustrated in FIG. 9, a projection 9 is formed projecting in the thickness direction midway in the vertical direction of the blade 8. In other words, the thickness T of the projection 9 is thicker than the thickness t1 of an upper side portion 10 of the projection 9 and the thickness t2 of a lower side portion 11 of the projection 9. The thickness t1 of the upper side portion 10 and the thickness t2 of the lower side portion 11 can be the same or can be different.

In this embodiment, the projection 9 is formed that projects on both sides in the thickness direction of the blade 8. Preferably, the amount of projection on both sides in the thickness direction of the projection 9 is the same. In this way, the size of a small gap g formed on both sides in the thickness direction of the blade 8 as described later is uniform.

As illustrated in FIG. 7, when viewed the blade 8 in the width direction, the blade 8 has a stepped shape in which the lower side is narrower than the upper side. In this embodiment, the projection 9 is formed straddling both the broad width portion on the upper side (the portion corresponding to the upper side portion 7a of the exhaust groove 7) and the narrow width portion on the lower side (the portion corresponding to the lower side portion 7b of the exhaust groove 7). A communicating portion 12 as described later is formed in the center in the width direction of the blade 8. A chamfered portion 11a is formed on both edges of the bottom end of the blade 8. The chamfered portion 11a can have a circular arc shape.

The communicating portion 12 extends from below the projection 9 to above the projection 9 and penetrates the blade 8 in the thickness direction. In this embodiment, the communicating portion 12 is a cut out that opens to the bottom end of the blade 8 and that extends linearly in the vertical direction.

To manufacture this blade 8, for example, after manufacturing the blade 8 with a constant thickness T, the thicknesses of the top end and the bottom end of the blade 8 are reduced by pressing the top end and the bottom end from both sides in the thickness direction. The pressed portions become the upper side portion 10 and the lower side portion 11, and the portion not pressed becomes the projection 9, so it is possible to simply and conveniently manufacture the blade 8.

Then, the blade 8 is embedded by press fitting into the exhaust groove 7, and the small gap g is formed between the portion of the exhaust groove 7 expanded in the thickness direction by the projection 9 and the upper side portion 10 of the projection 9 of the blade 8. Then, the small gap g and the exhaust hole 13 are linked through the communicating portion 12.

When a green tire is vulcanized using the mold 1 on which these sectors 2 are assembled, as illustrated in FIG. 7, gas a such as unnecessary air, gas or the like is evacuated from the tire molding surface 5 through the small gap g and the communicating portion 12 to the exhaust hole 13, and is evacuated to the outside of the mold 1 through the end surface of the sector 2 or the like.

In order to prevent the occurrence of spewing while ensuring sufficient evacuation of gas when vulcanizing a green tire, the small gap g is from 0.01 mm to 0.10 mm, and more preferably is in the range of from 0.01 mm to 0.04 mm. The dimension of the small gap g is (thickness T−thickness t1)/2. The thickness T of the projection 9 of the blade 6 is about from 1.0 mm to 1.2 mm. The thickness of the exhaust groove 7 (the portion expanded by the projection 9) is substantially the same as the thickness T of the projection 9.

The length H1 in the vertical direction of the upper side portion 10 of the blade 9, in other words, the depth H1 from the tire molding surface 5 to the top end of the projection 9 is, for example, from 0.5 mm to 5 mm, and more preferably about from 1.0 mm to 2.0 mm. The depth H2 from the tire molding surface 5 to the exhaust hole 13 is, for example, from 2 mm to 10 mm, and more preferably about from 3 mm to 5 mm. The size of the exhaust hole 13 is, for example, about from 2 mm to 10 mm equivalent to the external diameter. The length in the vertical direction of the lower side portion 11 of the blade 9 is about from 1 mm to 5 mm.

The procedure for manufacturing the mold 1 according to the manufacturing method of the present technology is as follows.

Figure 10:
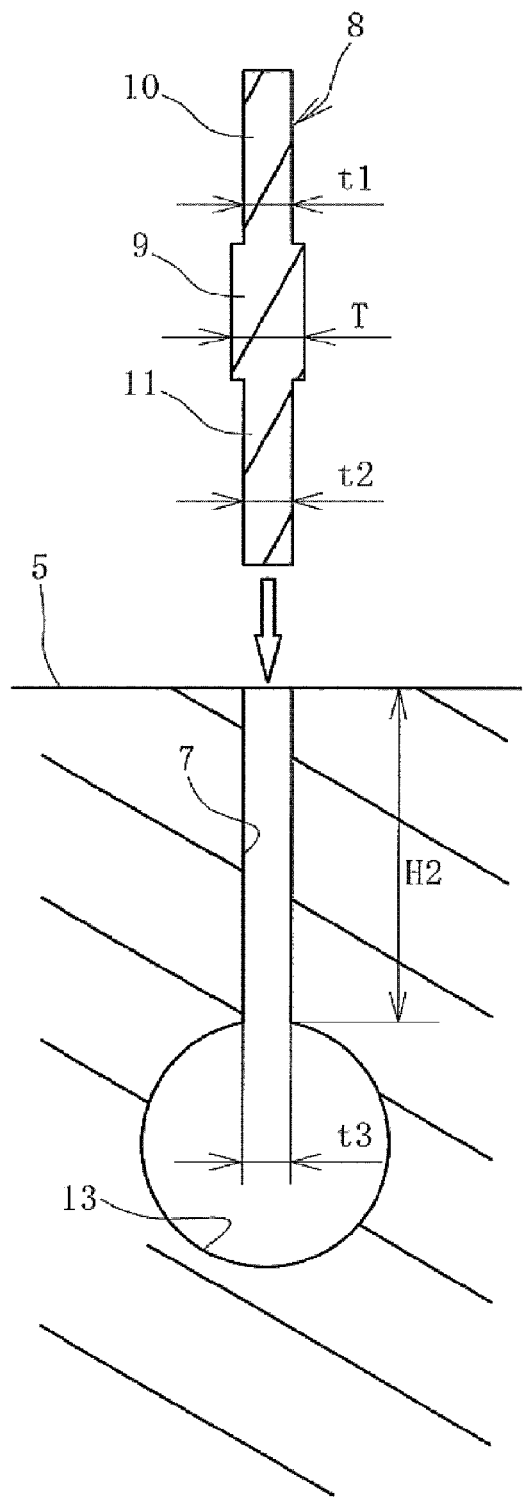
FIG. 10 is an explanatory view illustrating the process of inserting the blade of FIG. 9 in the exhaust groove when viewed in the cross-section A-A of FIG. 4.

The exhaust grooves 7 are formed in the tire molding surface 5 of the piece 3 manufactured to a predetermined shape. The exhaust grooves 7 are communicated with the exhaust hole 13. Here, as illustrated in FIG. 10, initially, the exhaust groove 7 has a constant thickness t3, and the exhaust groove 7 is formed so that the thickness t3 is about from 0.005 mm to 0.02 mm thicker than the thickness t2 of the lower side portion 11 of the blade 8, and is thinner than the thickness T of the projection 9 of the blade 8. Also, the shape of the exhaust groove 7 when viewed in the width direction, as illustrated in FIG. 11, has the upper side portion 7a and the lower side portion 7b, and is formed with a stepped shape, the same as the blade 8 when viewed in the width direction.

Figure 11:
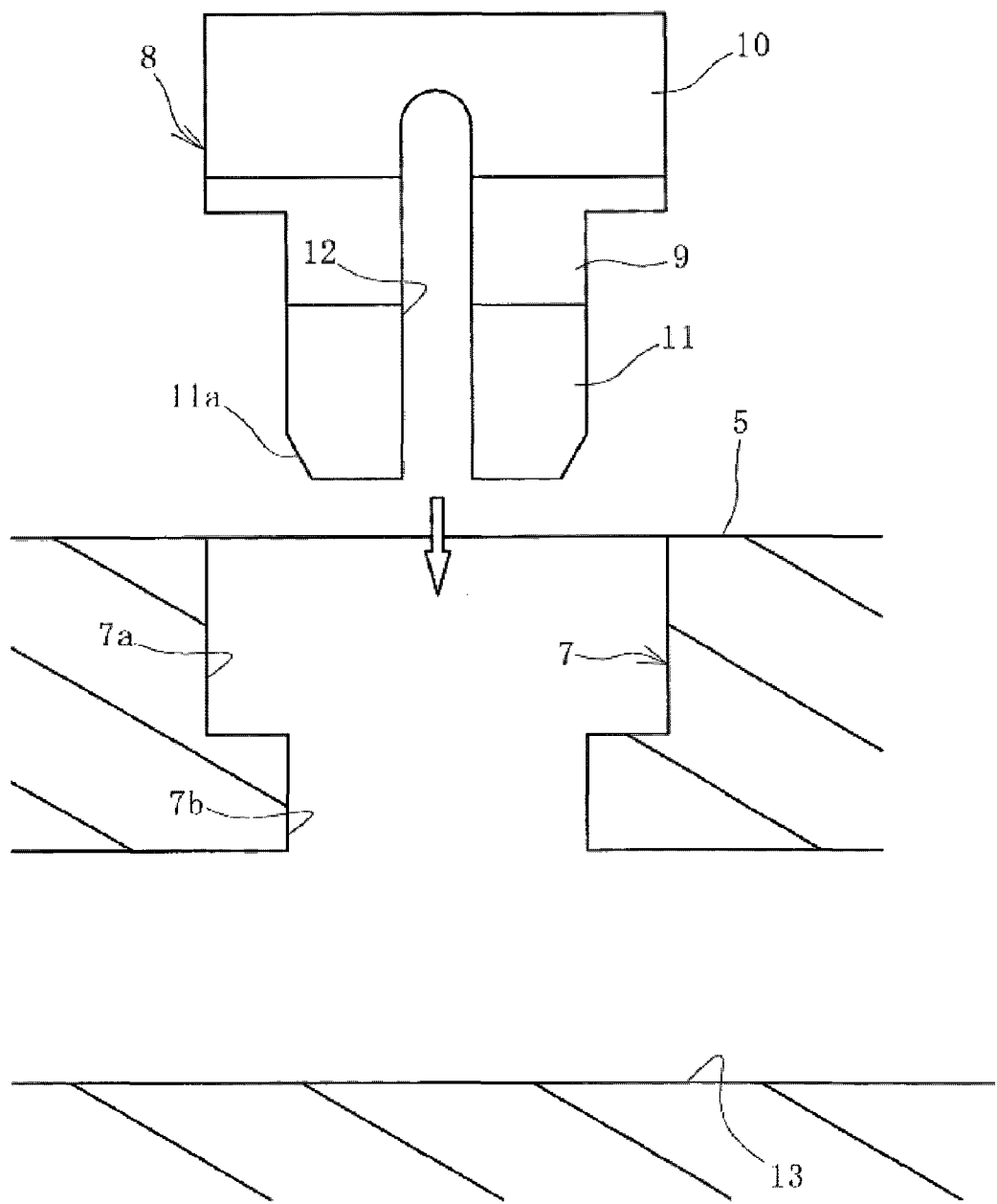
FIG. 11 is an explanatory view illustrating the process of inserting the blade of FIG. 9 in the exhaust groove when viewed in the cross-section B-B of FIG. 4.
Figure 12:
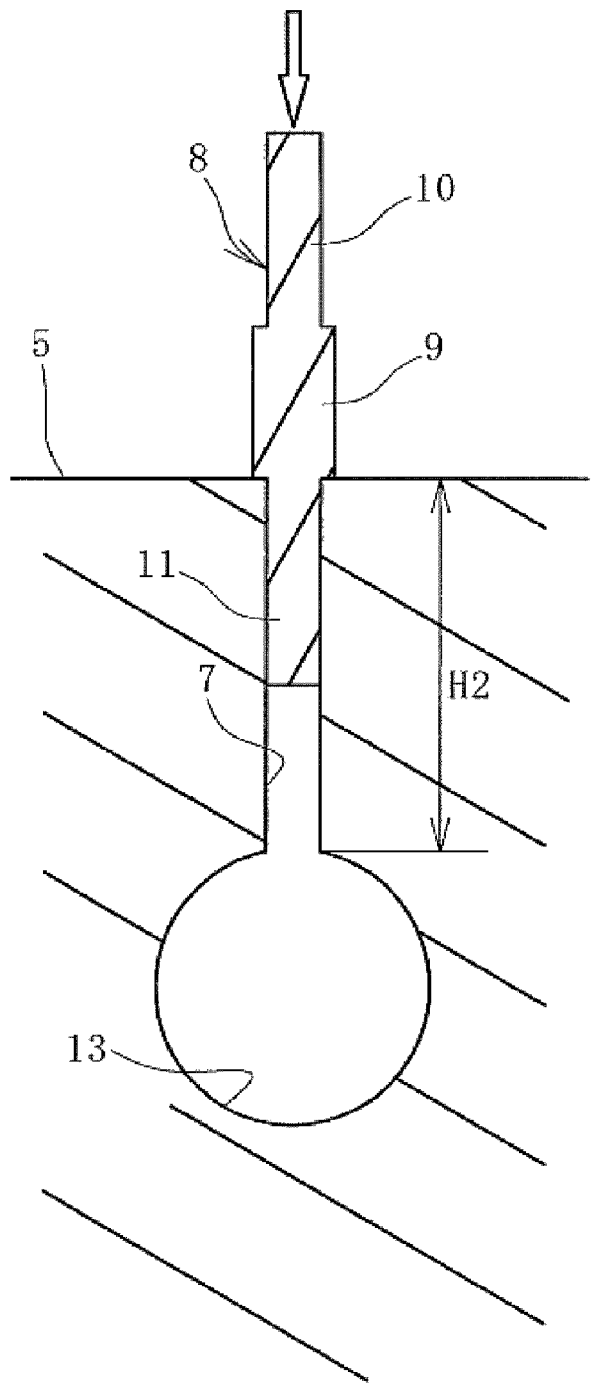
FIG. 12 is an explanatory view illustrating the state in which the bottom end of the blade of FIG. 9 is inserted in the exhaust groove and positioned when viewed in the cross-section A-A in FIG. 4.

Next, as illustrated in FIGS. 10 to 12, the bottom end of the blade 8 (lower side portion 11) is inserted into the exhaust groove 7, and the bottom end is fitted and positioned in the exhaust groove 7. Because the blade 8 can be positioned, the subsequent operation of press fitting the blade 8 is easy. By making the initial thickness t3 of the exhaust groove 7 slightly thicker than the thickness t2 of the lower side portion 11 of the blade 8, the lower side portion 11 can be easily and smoothly inserted into the exhaust groove 7.

Next, the blade 8 positioned as illustrated in FIG. 12 is embedded in the exhaust groove 7 by press fitting in the thickness direction into the exhaust groove 7. As a result of this press fitting, the portion of the exhaust groove 7 corresponding to the projection 9 (the portion that is the track of movement of the projection 9) only is expanded in the thickness direction by the projection 9, and its thickness changes from t3 to T. When the blade 8 is embedded in the exhaust groove 7 while the exhaust groove 7 is expanded in the thickness direction by the projection 9 as described above, the condition illustrated in FIGS. 6 to 8 is formed.

The blade 8 is embedded in the exhaust groove 7 that has been expanded in the thickness direction, so it is strongly fixed in the exhaust groove 7 and cannot easily move. Also, the thickness T of the projection 9 and the thickness t1 of the upper side portion 10 of the blade 8 are accurately processed. Therefore, the small gap g with stable dimensions is formed between the portion of the exhaust groove 7 that has been expanded in the thickness direction by the projection 9 and the upper side portion 10 of the projection 9 of the blade 8.

Then, the small gap g uniformly formed on both sides in the thickness direction of the blade 8 and the exhaust hole 13 are linked by the communicating portion 12, so it is possible to ensure appropriate evacuation of gas during vulcanization of green tires. Associated with this is the benefit that vulcanization defects of the tire are prevented. Also, even if the mold 1 is used for a long time, it is difficult for the blade 8 to fall out from the exhaust groove 7, so maintenance is improved.

In this embodiment, the chamfered portion 11a is provided on both edges of the bottom end of the blade 8, so it is possible to smoothly insert the blade 8 into the exhaust groove 7. Even if the top end aperture of the exhaust groove 7 is contacted when inserting the blade 8, the chamfered portion 11a contacts, and this has the advantage that it is difficult to damage the parent metal of the piece 3 compared with the case of contact with a sharp corner.

Figure 13:
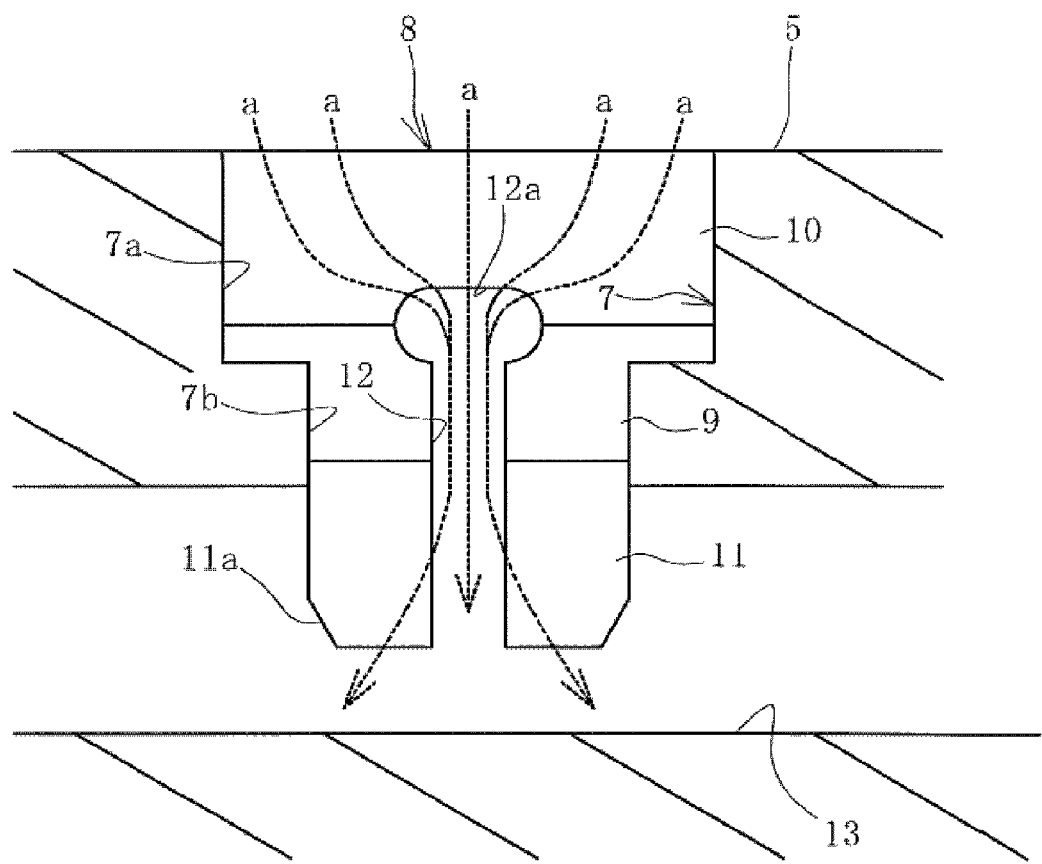
FIG. 13 is an explanatory view illustrating a blade provided with an expanded portion at the top end of the communicating portion, embedded in the exhaust groove when viewed in the cross-section B-B in FIG. 4.

As illustrated in FIG. 13, the communicating portion 12 can have an expanded portion 12a at the top end thereof that is expanded in the width direction more than the other portion. If the expanded portion 12a is provided, evacuation of unnecessary gas such as air, gas or the like through the expanded portion 12a is promoted, so it is possible to improve the evacuation efficiency.

Figure 14:
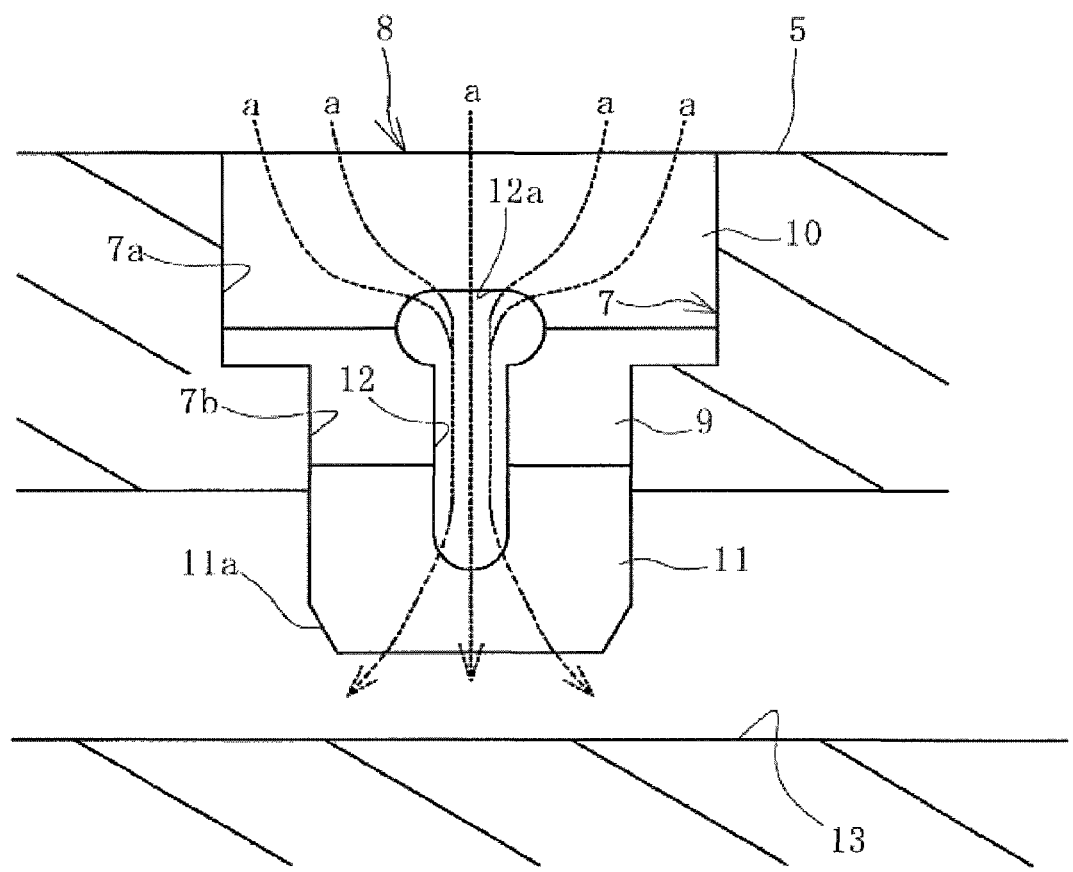
FIG. 14 is an explanatory view illustrating the state in which a blade in which the communicating portion is a single through hole is embedded in the exhaust groove when viewed in the cross-section B-B in FIG. 4.

The communicating portion 12 does not necessarily have the shape of a cut out, but can be a through hole that penetrates the blade 8 in the thickness direction as illustrated in FIG. 14. In this case, the strength of the bottom end of the blade 8 is increased, so it is easy to reduce deformation of the blade 8 in press fitting the blade 8 into the exhaust groove 7. In other words, compared with the case where the communicating portion 12 is a cut out shape, it is possible to make the blade 8 thinner.

Figure 15:
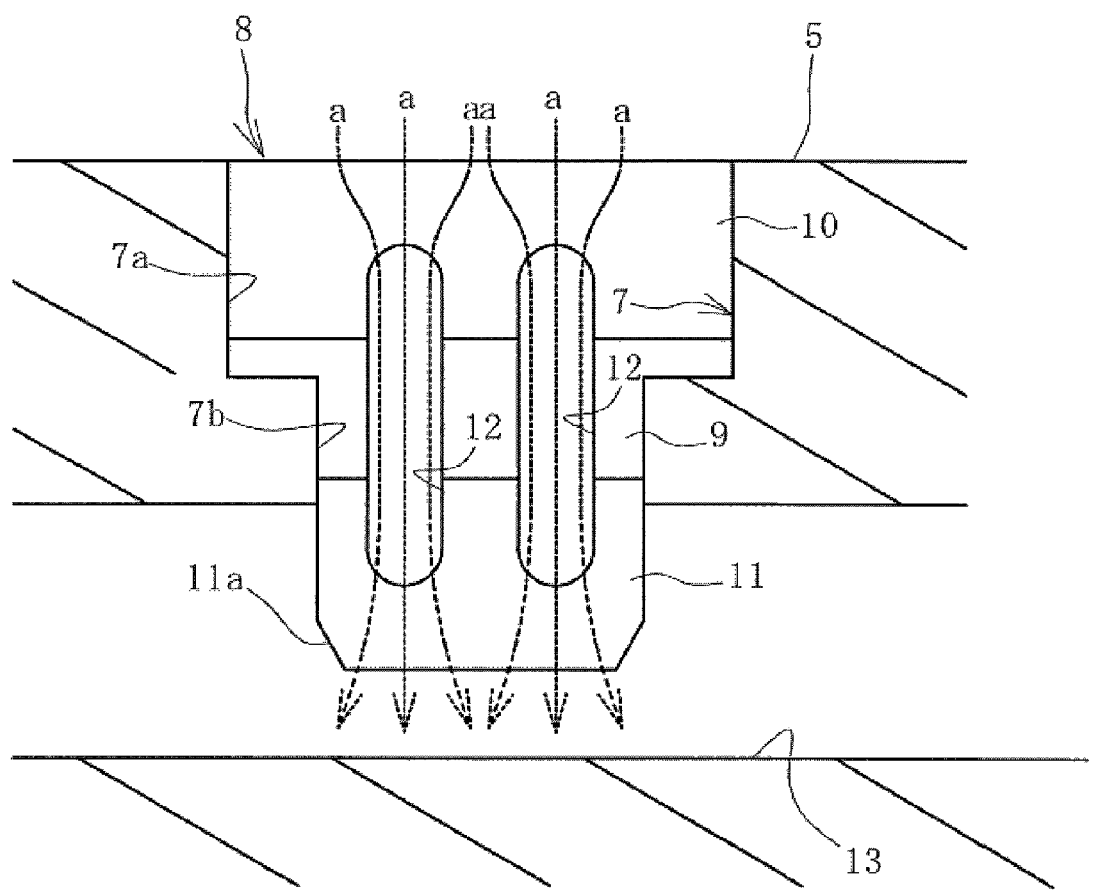
FIG. 15 is an explanatory view illustrating the state in which a blade in which the communicating portion is two through holes is embedded in the exhaust groove when viewed in the cross-section B-B in FIG. 4.

As illustrated in FIG. 15, it is possible to provide a plurality of communicating portions 12. FIG. 15 illustrates a case in which the communicating portion 12 is a through hole, but it is also possible to provide a plurality of communicating portions 12 that have a cut out shape.

Figure 16:
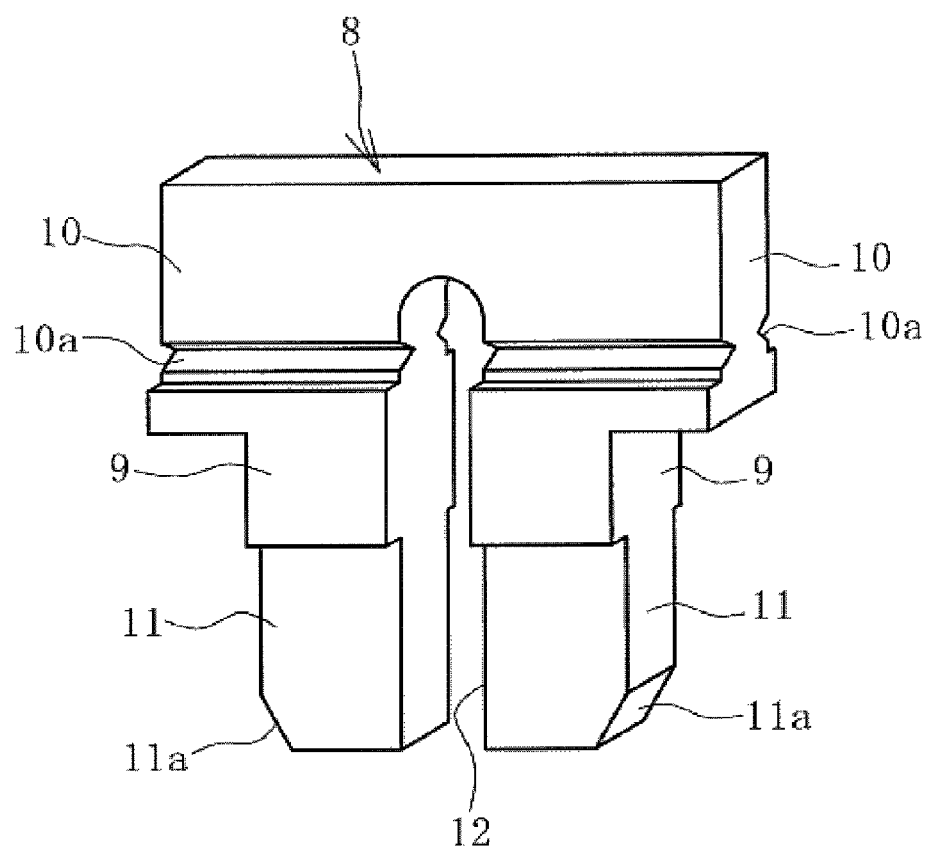
FIG. 16 is a perspective view illustrating a blade provided with an auxiliary groove in an upper side portion of the projection.
Figure 17:
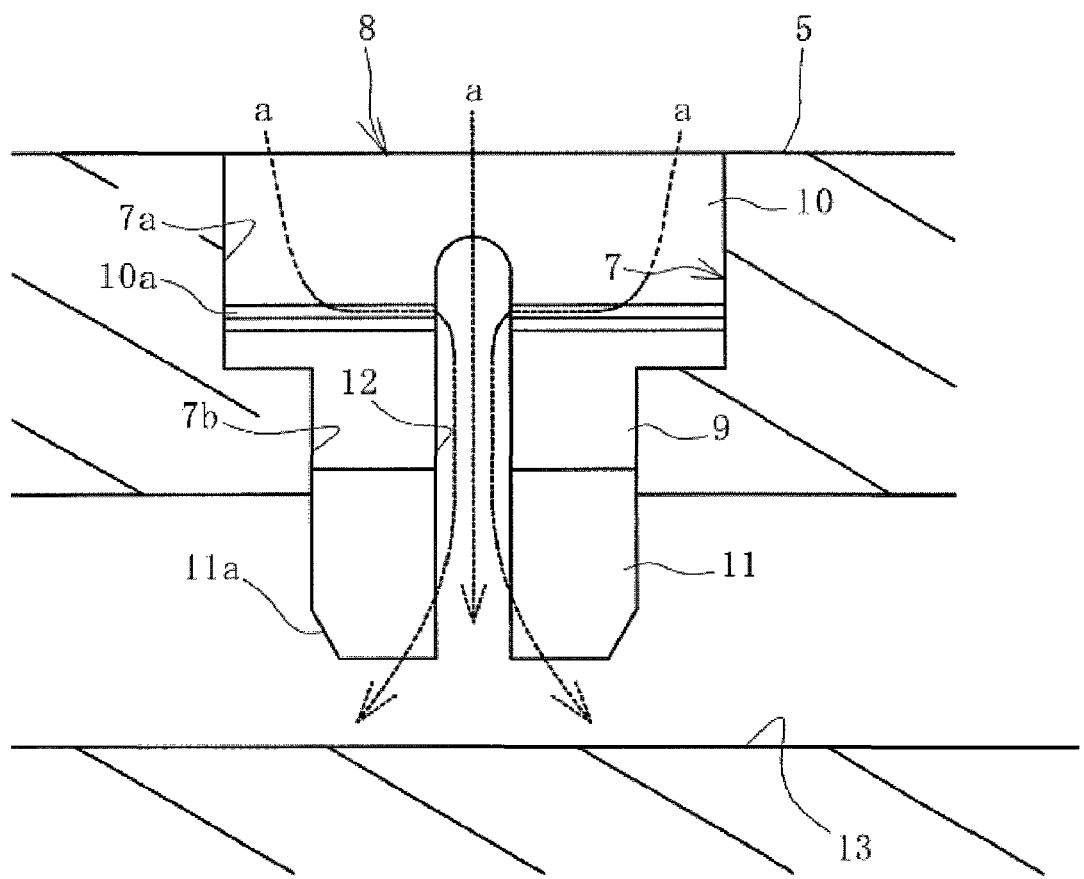
FIG. 17 is an explanatory view illustrating the state in which the blade of FIG. 16 is embedded in the exhaust groove when viewed in the cross-section B-B in FIG. 4.

As illustrated in FIG. 16, an auxiliary groove 10a to be connected to the communicating portion 12 can be provided in the upper side portion 10 of the blade 8. A V-groove, a U-groove or the like can be adopted as the auxiliary groove 10a. If the auxiliary groove 10a is provided, as illustrated in FIG. 17, evacuation of unnecessary gas such as air, gas or the like is promoted through the auxiliary groove 10a, so it is possible to improve the evacuation efficiency.

Figure 18:
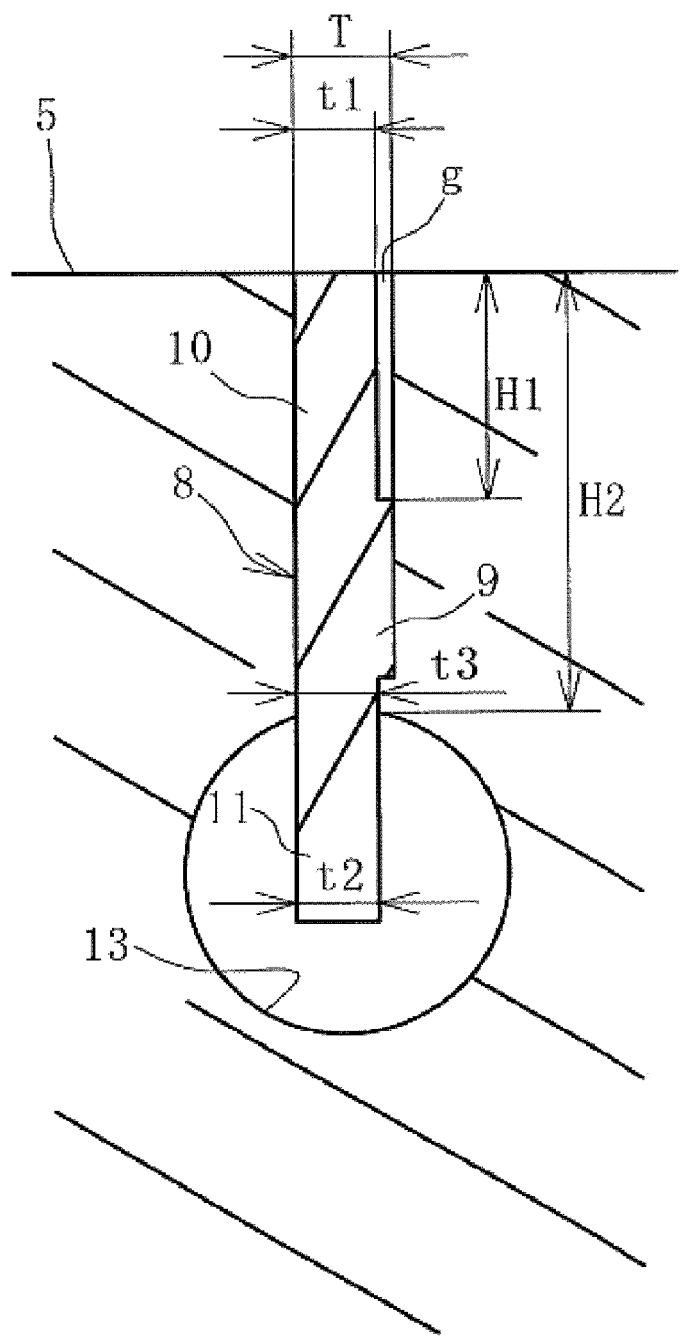
FIG. 18 is an explanatory view illustrating the state in which a blade having a projection that projects on a first side only in the thickness direction is embedded in the exhaust groove when viewed in the cross-section A-A in FIG. 4.

It is also possible to form the projection 9 projecting only on a first side in the thickness direction of the blade 8, as illustrated in FIG. 18. In this case, the dimension of the small gap g is the thickness T−the thickness t1. The small gap g formed only on the first side in the thickness direction of the blade 8 is linked to the exhaust hole 13 through the communicating portion 12.

The present technology can be applied not only to a mold 1 constituted by sectors 2 that include the piece 3 and the back block 4, but also to a mold 1 in which the piece and the back block 4 are integral.

Also, the top end surface of the blade 8 does not necessarily have to not project from the tire molding surface 5, but it may project from the tire molding surface 5. In other words, the blade 8 can be used as a siping blade for forming sipes in the tire.

The invention claimed is:
1. A tire vulcanization mold, comprising:
an exhaust groove opening to a tire molding surface;
a blade embedded in the exhaust groove that forms a small gap with the exhaust groove, the blade including:
   a projection that projects in a thickness direction of the mold to a midway point of the blade in a vertical direction, and
   a communicating portion that extends from below the projection to above the projection and that penetrates the blade in the thickness direction;

an exhaust hole that links the small gap with an outside of the mold; and the small gap formed between a portion of the exhaust groove expanded in the thickness direction by the projection and an upper side portion of the projection of the blade, the small gap being linked with the exhaust hole through the communicating portion.

2. The tire vulcanization mold according to claim 1, wherein an auxiliary groove that is connected to the communicating portion is provided in the upper side portion of the projection of the blade.

3. The tire vulcanization mold according to claim 2, wherein the communicating portion is a through hole that penetrates the blade in the thickness direction.

4. The tire vulcanization mold according to claim 1, wherein the communicating portion is a through hole that penetrates the blade in the thickness direction.

5. A manufacturing method for a tire vulcanization mold in which a small gap is formed between an exhaust groove and a blade by embedding the blade in the exhaust groove opening to a tire molding surface of the tire vulcanization mold, and the small gap is linked to an exhaust hole opening to an outside of the mold, the method comprising:

providing a projection that projects in a thickness direction midway in a vertical direction of the blade;

providing a communicating portion that extends from below the projection to above the projection and that penetrates the blade in the thickness direction;

forming the exhaust groove so that the thickness of the exhaust groove is thinner than the thickness of the projection;

inserting and positioning the bottom end of the blade in the exhaust groove;

forming the small gap between an upper side portion of the projection of the embedded blade and the exhaust groove by embedding the positioned blade by press fitting in the depth direction into the exhaust groove while expanding the exhaust groove in the thickness direction by the projection; and linking the small gap and the exhaust hole through the communicating portion.

6. The manufacturing method for a tire vulcanization mold according to claim 5, wherein an auxiliary groove that is connected to the communicating portion is provided in the upper side portion of the projection of the blade.

7. The manufacturing method for a tire vulcanization mold according to claim 6, wherein the communicating portion is a through hole that penetrates the blade in the thickness direction.

8. The manufacturing method for a tire vulcanization mold according to claim 5, wherein the communicating portion is a through hole that penetrates the blade in the thickness direction.

* * * * *